United States Patent
Konji

(10) Patent No.: US 9,971,553 B2
(45) Date of Patent: May 15, 2018

(54) CONTROL METHOD OF TERMINAL DEVICE, TERMINAL DEVICE, AND STORAGE MEDIUM

(71) Applicant: CANON KABUSHIKI KAISHA, Tokyo (JP)

(72) Inventor: Mitsuru Konji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/295,214

(22) Filed: Oct. 17, 2016

(65) Prior Publication Data

US 2017/0123739 A1    May 4, 2017

(30) Foreign Application Priority Data

Oct. 30, 2015   (JP) ................. 2015-213770

(51) Int. Cl.
| | |
|---|---|
| *G06F 3/12* | (2006.01) |
| *H04W 8/00* | (2009.01) |
| *H04W 76/02* | (2009.01) |
| *H04W 60/00* | (2009.01) |
| *H04W 88/06* | (2009.01) |

(52) U.S. Cl.
CPC .......... *G06F 3/1236* (2013.01); *G06F 3/1292* (2013.01); *H04W 8/005* (2013.01); *H04W 60/005* (2013.01); *H04W 76/023* (2013.01); *H04W 88/06* (2013.01)

(58) Field of Classification Search
USPC ........................................ 358/1.15
See application file for complete search history.

(56) References Cited

U.S. PATENT DOCUMENTS

2015/0116753 A1*  4/2015  Sato ................ G06F 3/1238
                                                  358/1.14
2015/0355875 A1* 12/2015  Matsushita ........ G06F 3/1236
                                                  358/1.15

FOREIGN PATENT DOCUMENTS

JP         2015-097344         5/2015

* cited by examiner

*Primary Examiner* — Ngon Nguyen
(74) *Attorney, Agent, or Firm* — Fitzpatrick, Cella, Harper & Scinto

(57) ABSTRACT

A method of controlling a terminal device includes the steps searching for a communication device, registering, if the communication device is detected, communication information used for a first network connection by which the detection of the communication device is performed, and determining if communication with the communication device is available by a second network connection to which the terminal device is currently connected. A second determining step determines if communication with the communication device is available by the first network connection, based on the registered communication information, and a communicating step communicates with the communication device using the first network connection if it is different from the second network connection and communication with the communication device is determined to be unavailable, and also if communication is determined to be available in the second determining step.

20 Claims, 14 Drawing Sheets

| NETWORK CONNECTION METHODS OF TERMINAL DEVICE |
|---|
| INFRASTRUCTURE MODE (VIA ACCESS POINT) |
| INFRARED COMMUNICATION |
| Bluetooth |
| Wi-Fi Direct |

| NETWORK CONNECTION METHODS OF PRINTER |
|---|
| INFRASTRUCTURE MODE (VIA ACCESS POINT) |
| ACCESS POINT MODE |
| Wi-Fi Direct |

| NETWORK CONNECTION METHOD |
|---|
| INFRASTRUCTURE MODE (VIA ACCESS POINT) |
| Wi-Fi Direct |
| ACCESS POINT MODE |

| NETWORK CONNECTION METHOD | NETWORK CONNECTION INFORMATION | |
|---|---|---|
| | MAC ADDRESS | SSID |
| INFRASTRUCTURE MODE (VIA ACCESS POINT) | GG:HH:II:JJ:KK:LL | ACCESS_POINT_A |
| Wi-Fi Direct | AA:BB:CC:DD:EE:FF | |
| ACCESS POINT MODE | MM:NN:OO:PP:QQ:RR | PRINTER_ACCESS_POINT |

| RANK | NETWORK CONNECTION METHOD | NETWORK CONNECTION INFORMATION | |
|---|---|---|---|
| | | MAC ADDRESS | SSID |
| 1 | Wi-Fi Direct | AA:BB:CC:DD:EE:FF | |
| 2 | ACCESS POINT MODE | MM:NN:OO:PP:QQ:RR | PRINTER_ACCESS_POINT |
| 3 | INFRASTRUCTURE MODE (VIA ACCESS POINT) | GG:HH:II:JJ:KK:LL | ACCESS_POINT_A |

CONTROL METHOD OF TERMINAL DEVICE, TERMINAL DEVICE, AND STORAGE MEDIUM

BACKGROUND OF THE INVENTION

Field of the Invention

The present invention relates to technology for automatically switching a wireless network connection.

Description of the Related Art

Recently, network connection methods used in wireless communication between a terminal device and a communication device acting as a communication peer of the terminal device are becoming more diversified. For example, there is a connection method called infrastructure mode in which a wireless LAN function is used to connect through an access point, and a P2P connection method in which the terminal device and the communication device connect directly without using an access point. As an example, usage scenarios are being conducted in which an infrastructure mode connection is used indoors, while a P2P connection using Wi-Fi Direct is used outdoors.

In addition, some terminal devices include an onboard operating system (OS) that automatically selects a network connection method that enables connection to the Internet, or automatically breaks a connection to reduce power consumption.

Japanese Patent Laid-Open No. 2015-97344 discloses a method of deciding a priority ranking of access points to use, and automatically establishing a network connection through an access point in accordance with the priority ranking.

However, the connection methods between a terminal device A and a communication device B, as well as the networks that the communication device B is able to communicate with, may include connections that go through an access point in some cases, and Wi-Fi Direct connections that do not go through an access point in other cases. The method disclosed in Japanese Patent Laid-Open No. 2015-97344 decides a priority ranking of relay devices to use, but does not consider the communication environment, such as other connection methods that the communication device B acting as the communication peer may take, or other networks that the communication device B is able to communicate with. Consequently, in a case of the communication device B using a direct connection method as another communication environment that is different from going through an access point, the communication environment of the communication device B is not considered, and the terminal device A is unable to switch the network connection to a direct connection method automatically.

SUMMARY OF THE INVENTION

A control method of a terminal device according to the present invention is a control method of a terminal device that communicates over a predetermined wireless network with a communication device registered as a communication peer on the wireless network, the method including: a first determining step of determining whether or not communication with the communication device is available on a currently connected network, based on identification information identifying the communication device and obtained when the communication device was registered; a second determining step of determining whether or not changing a current network connection to a network that was used by the communication device when the communication device was registered is possible; and a changing step of changing the current network connection to the network, if communication with the communication device is determined to be unavailable in the first determining step, and also if changing the current network connection is determined to be possible in the second determining step.

Further features of the present invention will become apparent from the following description of exemplary embodiments (with reference to the attached drawings).

BRIEF DESCRIPTION OF THE DRAWINGS

FIGS. 11A to 11E are diagrams illustrating network connection method lists and network connection method candidate lists according to a second embodiment;

DESCRIPTION OF THE EMBODIMENTS

Hereinafter, preferred embodiments of the present invention will be described in detail with reference to the attached drawings. However, the following embodiments do not limit the present invention as stated in the claims, and not all combinations of features described in these embodiments are necessarily required as means for the solving the problems addressed by the present invention.

<Embodiment 1>

The present embodiment illustrates an example of a case in which a printing device including a printing function is used as a communication device that acts as a communication peer of a terminal device. A scenario is supposed in which the terminal device transmits print data to the printing device via a wireless network, and the printing device prints using the received print data. The terminal device conducts a process of preregistering the printing device that acts as the communication peer. For example, the terminal device saves, in memory, connection information used to connect to the printing device. After that, when transmitting print data, the terminal device specifies which printing device to use from among already-registered printing devices, and attempts to start the transmission of print data to the specified printing device. At this point, the network connection currently being used by the terminal device in some cases may be different from the network connection when the printing device that is to receive the transmission of print data was registered. For such a case, the present embodiment describes an example in which the terminal device automatically switches the network connection by using connection information that was saved in association with the printing device acting as the communication peer when that printing device was registered. Additionally, if the terminal device is able to connect to the printing device as a result of automatically switching the network connection, the terminal device updates the connection information saved in memory with information by which a connection is successful. Hereinafter, a specific configuration will be described.

Figure 1:
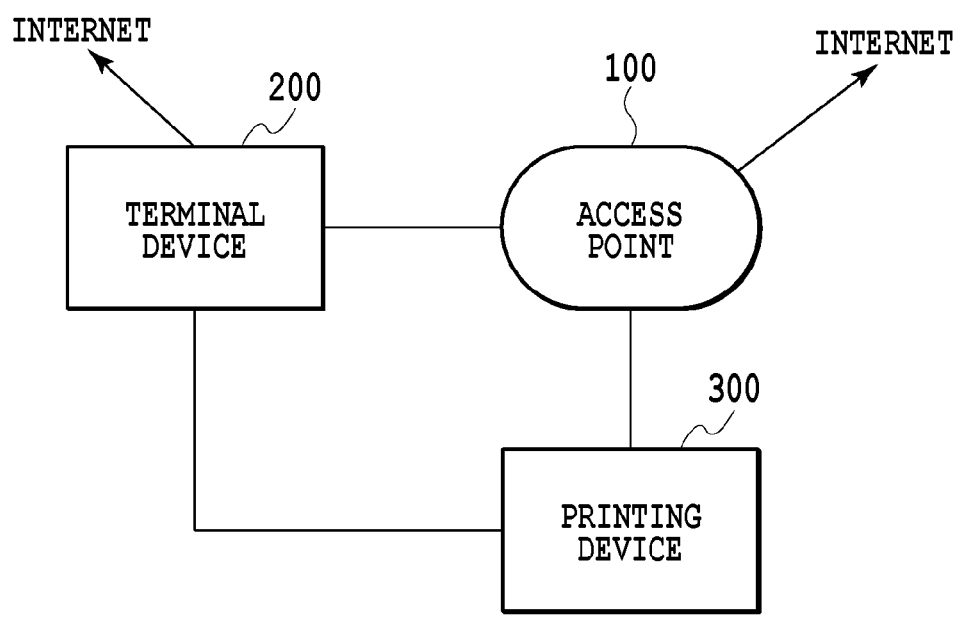
FIG. 1 is a configuration diagram of a system according to a first embodiment.

FIG. 1 is a diagram illustrating a configuration of a print processing system according to the present embodiment. The system illustrated in FIG. 1 includes an access point 100, and a portable terminal device 200 and a printing device 300 which are connectable to the access point 100. The terminal device 200 may be a personal information terminal such as a personal digital assistant (PDA), a smartphone, a mobile phone, a personal computer, or a digital camera, for example. The terminal device 200 may be any type of device capable of exchanging data or other information with a communication device that acts as the communication peer (in the example illustrated in FIG. 1, a printing device).

The access point 100 is a relay device used to connect the terminal device 200 and the printing device 300 to the Internet. Additionally, the terminal device 200 may also connect to a mobile phone network, and connect to the Internet through the mobile phone network.

The printing device 300 that acts as a communication device includes a printing function of printing an image onto a print medium using a print engine such as inkjet. Additionally, the printing device 300 may also include a scanning function of scanning a document placed on a platen, a fax function, and a phone function.

The terminal device 200 and the printing device 300 are capable of a wireless LAN connection via infrastructure mode. In infrastructure mode, the terminal device 200 and the printing device 300 are capable of wirelessly communicating with each other through the external access point 100, or through an access point unit 308 inside the printing device 300 discussed later. Note that the access point unit 308 is an access point built into the printing device 300. From the perspective of the terminal device 200, the access point unit 308 operates similarly to the case of connecting to the printing device 300 via the access point 100.

In addition, the terminal device 200 and the printing device 300 include a short-range wireless communication function and a P2P communication function (for example, a communication function according to Wi-Fi Direct). The terminal device 200 and the printing device 300 are also capable of communicating with each other by making a wireless connection directly, rather than going through an access point. Note that the above short-range wireless communication refers to wireless communication as typified by near field communication (NFC), in which the communication range is a comparative short, set range (for example, from a few centimeters to one meter).

Figure 2:
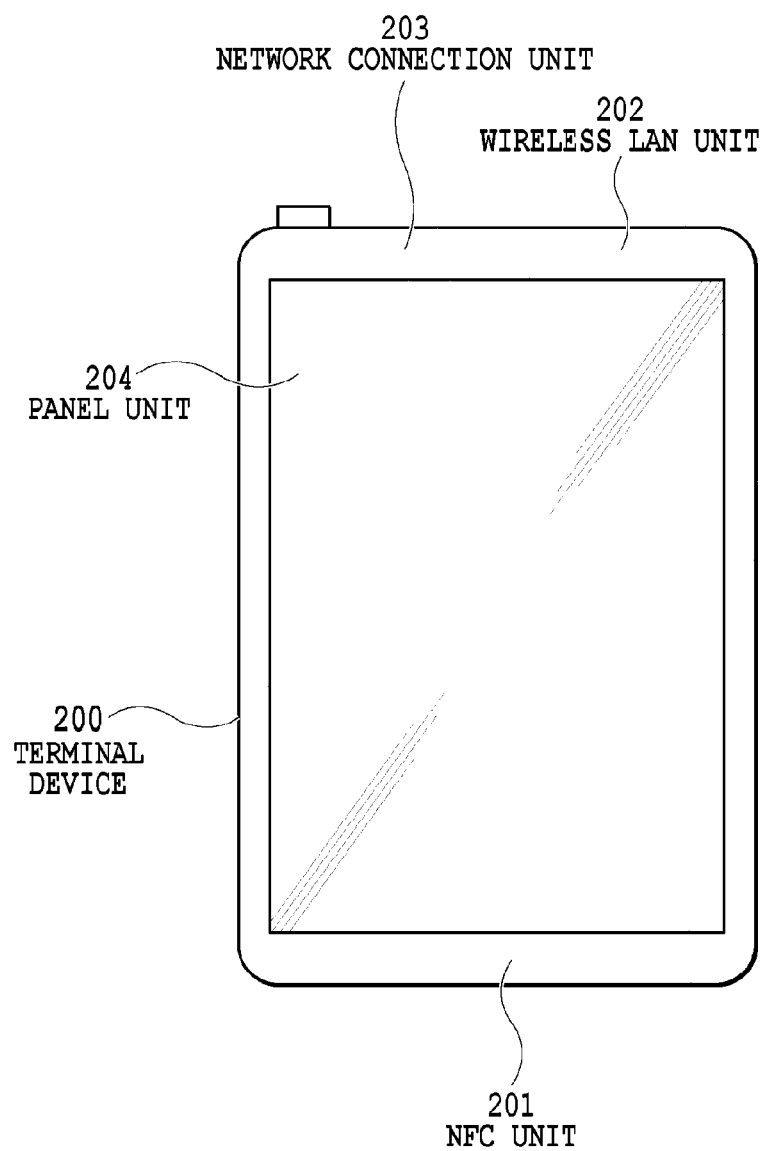
FIG. 2 is a configuration diagram of a terminal device according to a first embodiment.

FIG. 2 is a diagram illustrating an example of the exterior appearance of the terminal device 200. In the present embodiment, a smartphone is given as an example. A smartphone is a multi-function terminal device equipped with not only mobile phone functions, but also functions such as a camera, a web browser, and email.

The NFC unit 201 is a unit that conducts short-range wireless communication. The user brings the NFC unit 201 close to a peer NFC unit (in the present embodiment, an NFC unit of the printing device 300) within a certain distance (approximately 10 cm), thereby enabling communication between the NFC units. The wireless LAN unit 202 is a unit for communicating by wireless LAN, and is disposed inside the terminal device 200. The network connection unit 203 is a unit for communicating on the Internet via the mobile phone network, and is disposed inside the terminal device 200. The network connection unit 203 connects to the Internet using a communication standard such as Long Term Evolution (LTE), for example.

The panel unit 204 is a display equipped with a display mechanism of the LCD type, for example. The panel unit 204 is equipped with an operating mechanism of the touch panel type, and senses touch by the user on the panel unit 204. The panel unit 204 outputs press information, such as the position, strength, and touched region of a sensed touch on the panel unit 204, to a CPU 225 discussed later. Operating methods using the touch panel include a method of displaying user interface (UI) elements such as button icons and a software keyboard on the panel unit 204, and in response to the user pressing these UI elements, issuing events and executing certain functions.

Figure 3A:
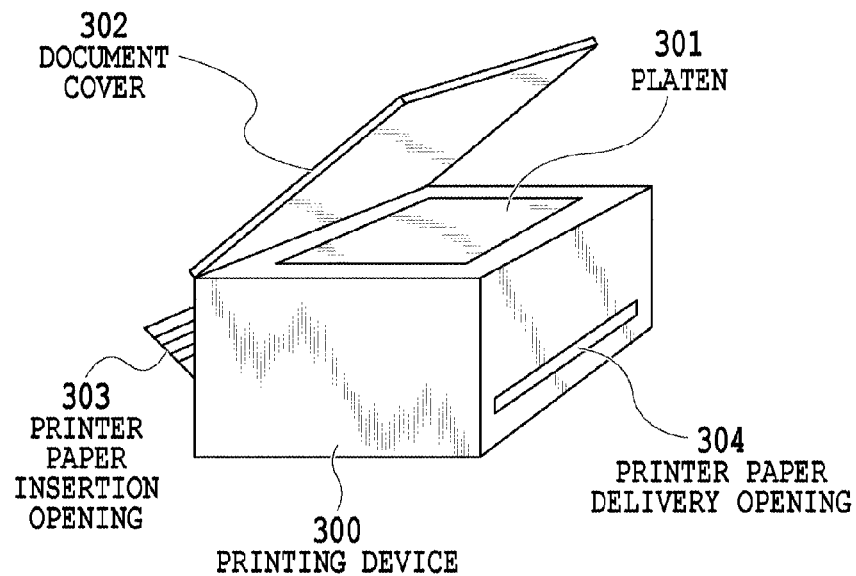
FIGS. 3A and 3B are exterior views of a printing device according to a first embodiment.
Figure 3B:
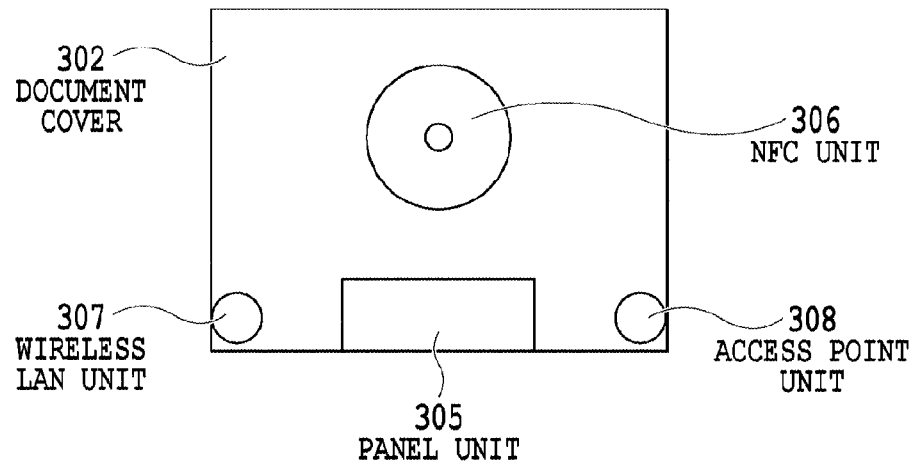

FIGS. 3A and 3B are diagrams illustrating an exterior appearance of a printing device. In the present embodiment, a multi-function printer (MFP) including a scanning function (scanner) in addition to the printing function discussed earlier is given as an example.

In FIG. 3A, the platen 301 is a glassy transparent bed. When performing a scan with the scanner, a document is placed on the platen 301. A document cover 302 is a cover for preventing scanning light from leaking outside when performing a scan with the scanner. The printer paper insertion opening 303 is an insertion opening into which various sizes of paper may be set. Paper set into the printer paper insertion opening 303 is conveyed one sheet at a time to a printing section, printed upon by the printing section, and delivered from the printer paper delivery opening 304.

As illustrated in FIG. 3B, on the top part of the document cover 302, a panel unit 305 and an NFC unit 306 are disposed. The panel unit 305 has a configuration similar to the panel unit 204 in the terminal device 200. Operating methods for the panel unit 305 include a method of displaying user interface (UI) elements such as button icons and a software keyboard on the panel unit 305, and having the user press these UI elements. As a result of the user pressing a UI element, an event is issued, and the printing device 300 executes a certain function in response to the issued event. The NFC unit 306 is a unit for conducting short-range wireless communication, and is the unit to which the terminal device 200 is brought close when the user conducts short-range wireless communication between the terminal device 200 and the printing device 300. A certain distance (approximately 10 cm) from the NFC unit 306 is the effective range of contact.

The wireless LAN unit 307 includes an embedded antenna for communicating by wireless LAN. Similarly to the access point 100 discussed earlier, the access point unit 308 has a function of an access point that relays a wireless LAN connection between the terminal device 200 and the printing device 300. The mode using the access point unit 308 built into the printing device is called the access point mode. However, the access point unit 308 is built into the printing device 300, and is different from the access point 100 that relays a wireless LAN connection between other devices. The access point unit 308 is a unit that is used primarily for the printing device 300 to establish a wireless LAN connection with another device.

Note that in the P2P communication according to the present embodiment, actually communication using the access point unit 308 is conducted. In other words, the access point unit 308 is a unit used in both access point mode (infrastructure mode from the perspective of the terminal device 200) and Wi-Fi Direct mode. In this way, the printing device 300 according to the present embodiment may have a configuration in which a unit that communicates wirelessly is shared in common between modes, or a configuration in which units that communicate wirelessly are provided separately for each respective mode.

Figure 4:
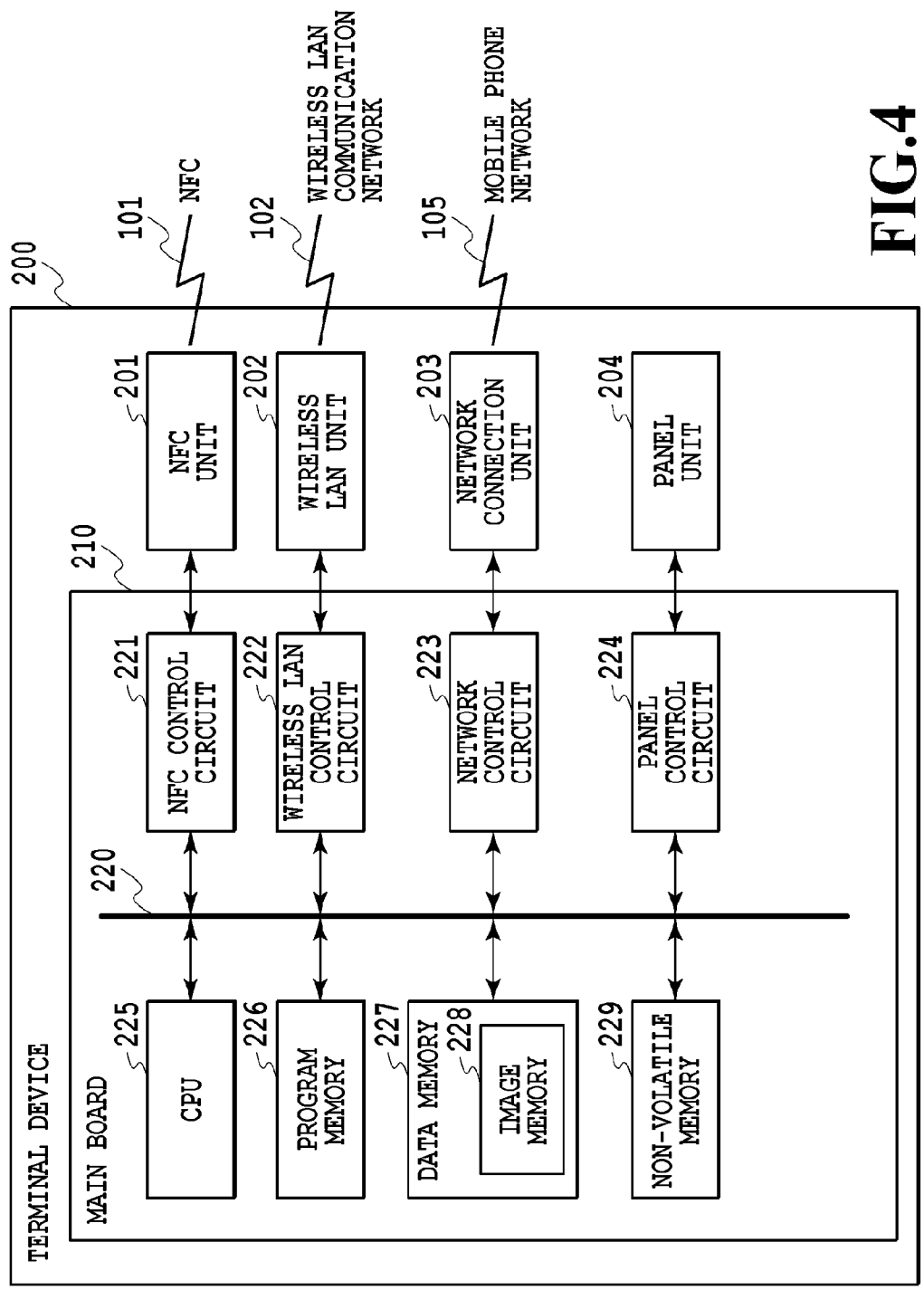
FIG. 4 is a block diagram illustrating a configuration of a terminal device according to a first embodiment.

FIG. 4 is a block diagram illustrating a configuration of a terminal device. The terminal device 200 includes a main board 210 that controls the device overall, the NFC unit 201, the wireless LAN unit 202, the network connection unit 203, and the panel unit 204. Herein, the NFC unit 201, the wireless LAN unit 202, and the network connection unit 203 all function as communication units of the terminal device 200. The CPU 225, which is configured as a microprocessor disposed on the main board 210, operates by following the contents of a control program saved in program memory 226, which is configured as ROM connected via an internal bus 220, and data memory 227, which is configured as RAM. The data memory 227 includes image memory 228 for saving image data.

The CPU 225 controls the wireless LAN unit 202 via a wireless LAN control circuit 222, and thereby communicates with other terminal devices over a wireless LAN communication network 102. Note that the wireless LAN control circuit 222 also includes a Wi-Fi Direct function, and the terminal device 200 is capable of direct communication (P2P communication) with the printing device, without going through an access point. The CPU 225 controls the NFC unit 201 via an NFC control circuit 221, and thereby is able to sense a connection with another NFC terminal via NFC 101, and exchange data with the other NFC terminal. The CPU 225 controls the network connection unit 203 via a mobile network control circuit 223, and thereby is able to connect to a mobile phone network 105, and handle phone calls or exchange data.

The CPU 225 controls a panel control circuit 224, and thereby is able to display information such as UI elements on the panel unit 204. Additionally, the CPU 225 receives press information output by the panel control circuit 224 (information related to a touch by the user on the panel unit 204) as a user operation, and is capable of control in response to the user operation. The non-volatile memory 229 is made up of memory, such as flash memory, and retains data even after being powered off. The non-volatile memory 229 saves information such as address book data, information about registered communication devices, and device information about previously connected devices, as well as image data the user wants to save, and programs such as application software that realizes various functions in the terminal device 200.

The CPU 225 executes, in the data memory 227, an OS and applications saved in the program memory 226 or the non-volatile memory 229. Consequently, various types of processes provided by the applications may be performed. For example, the CPU 225 executes a printing application that causes the printing device 300 to execute processes such as printing. Subsequently, the UI of the printing application is displayed on the panel unit 204 via the panel control circuit 224.

Figure 5:
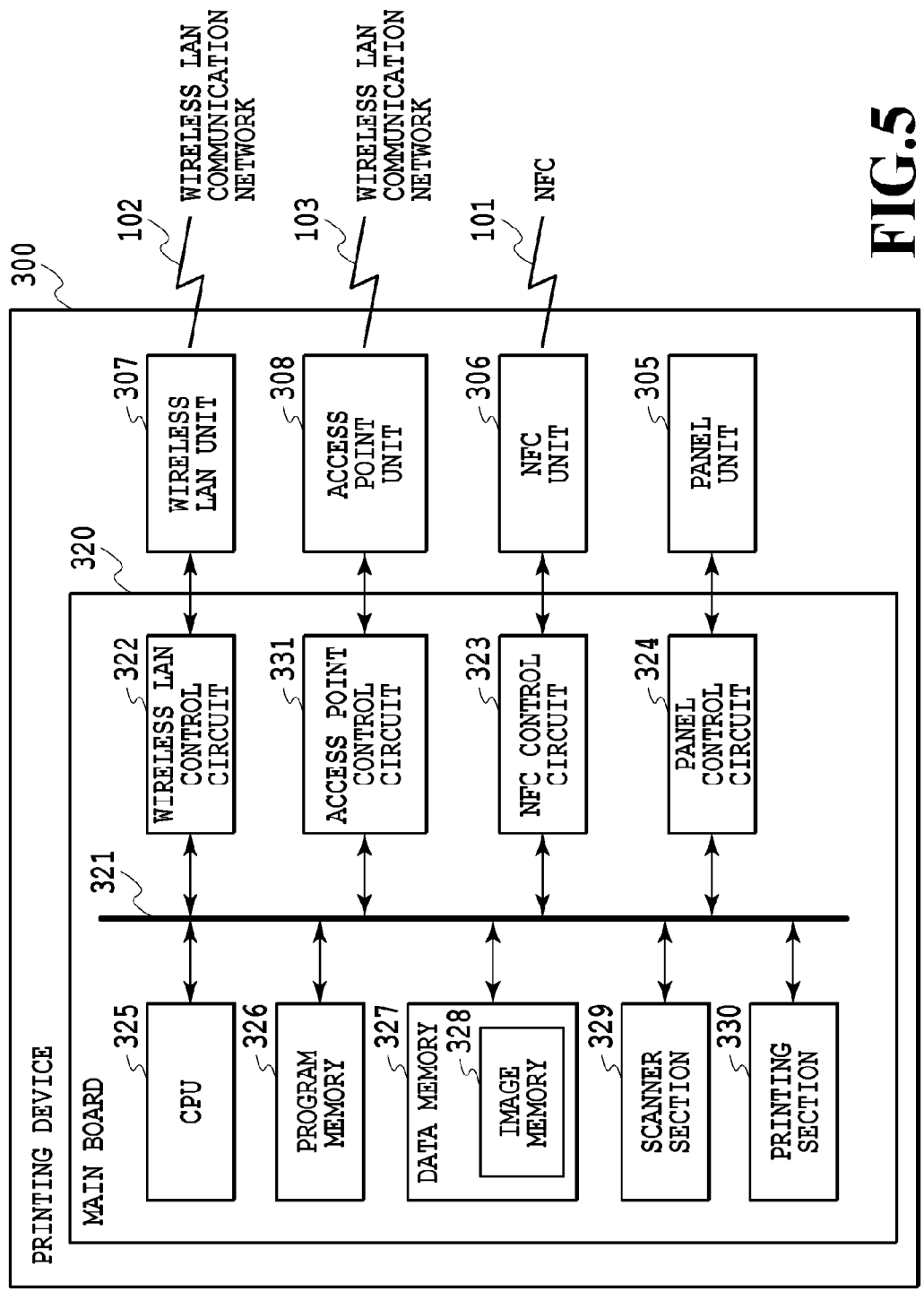
FIG. 5 is a block diagram illustrating a configuration of a printing device according to a first embodiment.

FIG. 5 is a block diagram illustrating a configuration of a printing device. The printing device 300 includes a main board 320 that controls the device overall, the NFC unit 306, the wireless LAN unit 307, the access point unit 308, and the panel unit 305. Herein, the NFC unit 306, the wireless LAN unit 307, and the access point unit 308 all function as communication units of the printing device 300. The CPU 325, which is configured as a microprocessor disposed on the main board 320, operates by following the contents of a control program saved in program memory 326, which is configured as ROM connected via an internal bus 321, and data memory 327, which is configured as RAM. The CPU 325 controls a scanner section 329 to scan a document and save a scanned image of the document in image memory 328 inside the data memory 327. Additionally, the CPU 325 is able to control a printing section 330 to print an image represented by an image data in the image memory 328 inside the data memory 327 onto a print medium.

The CPU 325 controls the wireless LAN unit 307 via a wireless LAN control circuit 322, and thereby communicates with other terminal devices over a wireless LAN communication network 102. Additionally, the CPU 325 controls the access point unit 308 via an access point control circuit 331, and thereby communicates with other terminal devices over a wireless LAN communication network 103. Note that the access point control circuit 331 also includes a Wi-Fi Direct function, and the printing device 300 is capable of direct communication (P2P communication) with the terminal device. Also, the CPU 325 controls the NFC unit 306 via an NFC control circuit 323, and thereby is able to sense a connection with another NFC terminal via NFC 101, and exchange data with the other NFC terminal.

The CPU 325 executes, in the data memory 327, an OS and applications saved in the program memory 326, and thereby is able to perform various types of processes provided by the applications. For example, the CPU 325 executes an application, and by the functions of the application, thereby displays the status of the printing device 300 and a function selection menu on the panel unit 305 via a panel control circuit 324. Additionally, the CPU 325 is capable of receiving operations from the user through the application. For example, the CPU 325 executes a management application which manages the printing device 300 and which is saved in the program memory 326. Subsequently, the UI of the management application is displayed on the panel unit 305 via the panel control circuit 324.

Figure 6:
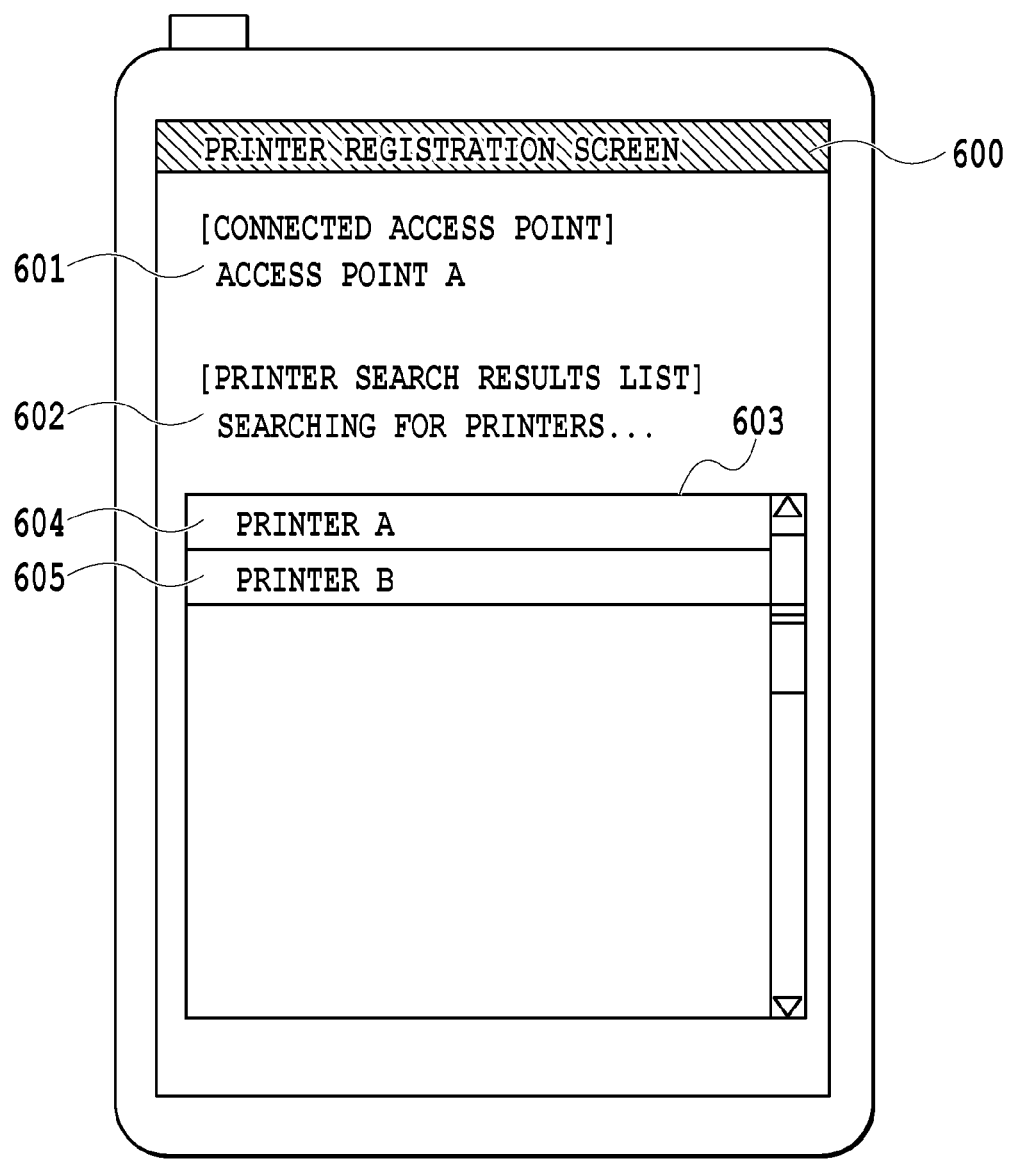
FIG. 6 is a UI diagram illustrating a printer registration screen of a printing application in a terminal device according to a first embodiment.

FIG. 6 is a diagram illustrating a printer registration screen 600 from among the screens displayed as a result of the CPU 225 of the terminal device 200 executing a printing application. In the printing application, it is possible to register specifying information for specifying a printing device on a wireless network, and printing device information related to the printing device. The registered information is saved in the non-volatile memory 229. Herein, the specifying information for specifying a printing device on a wireless network is taken to be identification information (a MAC address) used to specify a printing device when establishing a wireless network connection. The specifying information may also include other information, such as an IP address. The printing device information related to a printing device is taken to be information related to the features of the printing device, such as a list of paper types usable for printing, and information such as the name of the printing device. The printing application conducts a process of registering the above specifying information and the above printing device information, thereby causing this information to be associated together and saved in the non-volatile memory 229. A printer for which such a registration process has been executed is designated a registered printer. Note that in the following, the printing device 300 may be called a printer in some cases for the sake of simplicity, but these terms are used interchangeably. As discussed later, when the user of the terminal device 200 launches the printing application and specifies the execution of a printing process, the user selects a printer to print with from among the registered printers. Obviously, if there is one registered printer, that printer is selected.

If the printing application is used to conduct a printer search process, printers found as a result of the search are displayed in a list format on the printer registration screen 600. In FIG. 6, the names of printers included in the printing device information are displayed in a list format. The user selects a printer to register from the group of printers listed on the printer registration screen 600, thereby causing the registered printer to be decided. Obviously, it is also possible to select multiple registered printers. Note that although the following example describes the registered information as being saved in the non-volatile memory 229, the registered information may also be saved in the program memory 226.

The description of the printer registration screen 600 illustrated in FIG. 6 will now continue. On the printer registration screen 600, the Service Set Identifier (SSID) of the access point to which the terminal device 200 currently is connected is displayed as the access point name 601. In FIG. 6, the access point name is indicated as Access Point A for the sake of convenience. In a message 602, a message stating the process currently being executed on the current screen is displayed. In the present embodiment, in the printing application, a printer search is started automatically after the registration screen is displayed. When the printer search is executed, a message indicating that a search is in progress is displayed in the message 602. When the search ends, a message indicating that the search is complete is displayed. The results of the printer search are displayed in a search results list 603.

Note that during the printer search, the terminal device is capable of searching while switching the connection method to different network connection methods. The printing application searches not only for printers on the network to which the terminal device 200 is currently connected, but also for printers connectable by another connection method. The terminal device conducts successive printer searches with the network connection methods usable by the terminal device to connect, and then merges and displays the results in the search results list 603. On the printer registration screen 600 illustrated in FIG. 6, a printer 604 found via infrastructure mode (in the illustrated example, PRINTER A) and a printer 605 found via Wi-Fi Direct (in the illustrated example, PRINTER B) are both displayed.

In the search in infrastructure mode, a query of whether or not a communication device is a printer is broadcasted to the communication devices connected to the access point to which the current terminal device currently is connected. If the communication device responds to the broadcast communication, and the terminal device successfully receives the response, that communication device is determined to be a printer in infrastructure mode. Additionally, the printing application associates together and saves, in the non-volatile memory 229, the printer and the network connection method of the printer. Also, since network connection information (for example, the SSID and the MAC address) is also included in the above response from the communication device, the printing application additionally associates and saves the network connection information. Note that a printer found by infrastructure mode is a printer found via the access point being displayed in the access point name 601 (in the illustrated example, ACCESS POINT A).

Meanwhile, in the Wi-Fi Direct search, the terminal device conducts service discovery, and searches for a communication device that is connectable by Wi-Fi Direct. In addition, the printing application extracts only equipment including a printing function from the information obtained from conducting the search. The printing application determines the extracted equipment to be a printer supporting Wi-Fi Direct. Additionally, the printing application associates together and saves, in the non-volatile memory 229, the printer and the network connection method of the printer. Also, since network connection information (for example, the MAC address) is also included in the information acquired by service discovery, the printing application additionally associates and saves the network connection information. The wireless communication environment is specified by the network connection method and the network connection information. For example, even in the case of infrastructure mode, if the access point is different, the wireless communication environment also becomes different.

In other words, the process described above may be considered to be a process of registering a printer connectable to the terminal device with the connection method that the printer currently is applying. For example, suppose that Printer A and Printer B both are capable of a connection in infrastructure mode via Access Point A, and are also capable of a connection by Wi-Fi Direct. Suppose that when the printing application conducts the registration process, Printer A is operating on the wireless LAN of Access Point A in infrastructure mode, while Printer B is operating in Wi-Fi Direct mode. In this case, if the terminal device connects to Access Point A and searches for a printer, Printer A will be detected, as illustrated in FIG. 6. In addition, if the terminal device disconnects from infrastructure mode and establishes a network connection in Wi-Fi Direct mode to perform a search, Printer B will be detected. Note that even if the terminal device currently is not connected to Wi-Fi Direct, if the terminal device is equipped with an OS capable of searching for a communication device operating in Wi-Fi Direct mode, Printer B is detectable even while the terminal device is connected in infrastructure mode. In this case, Printer A and Printer B are displayed at the same time.

Note that if there are multiple connectable networks in infrastructure mode, or in other words, if the terminal device is able to connect to multiple access points, the terminal device connects to each access point and performs a printer search.

In the present embodiment, by conducting the registration process in advance, the terminal device is able to ascertain the network connection method and the network connection information of a printing device that acts as a communication peer of the terminal device. Furthermore, as discussed later, the terminal device uses this information to conduct an automatic network switching process. Details will be discussed later.

Figure 7:
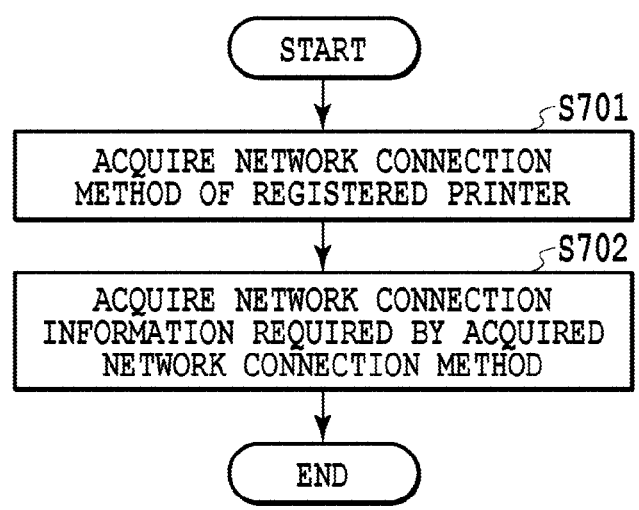
FIG. 7 is a flowchart of saving a network connection candidate of a registered printer, executed in a terminal device according to a first embodiment.

FIG. 7 is a flowchart of a process of saving a network connection candidate of a registered printer in the non-volatile memory 229 according to the present embodiment, as part of the printer registration process executed on the printer registration screen 600. A network connection candidate is the collective term for a network connection method and corresponding network connection information. For example, the network connection method is different between infrastructure mode and Wi-Fi Direct. On the other hand, even if the network connection method is the same infrastructure mode, the access point (as specified by the network connection information) is different in some cases. In other words, by using the network connection method and the network connection information in conjunction with each other, the terminal device becomes able to specify a network to switch the connection automatically. FIG. 7 is a flowchart of a process by which information required to specify a candidate to switch to in this way, namely a network connection candidate, is acquired and saved in the non-volatile memory 229.

The process illustrated in FIG. 7 is executed by the printing application. More specifically, the printing application saved in the program memory 226 of the terminal device is loaded into the data memory 227 and executed by the CPU 225, thereby causing the printing application to be launched. Additionally, the process is started when the printing application receives the selection of a registered printer by the user on the printer registration screen as illustrated in FIG. 6, for example.

In step S701, the printing application acquires the network connection method of the registered printer. For example, if the printer 604 illustrated in FIG. 6 is selected as the registered printer, infrastructure mode is acquired, whereas if the printer 605 is selected as the registered printer, Wi-Fi Direct is acquired. After the network connection method is acquired, the process proceeds to step S702. In step S702, the printing application acquires network connection information required to connect via the network connection method acquired in step S701. For example, if the printer 604 illustrated in FIG. 6 is selected as the registered printer, the network connection method is infrastructure mode. Accordingly, the printing application acquires, for example, the SSID of the access point 100 to which the terminal device currently is connected, and the MAC address of the printer. On the other hand, if the printer 605 is selected as the registered printer, the network connection method is Wi-Fi Direct. For this reason, the printing application acquires the network connection information required for the terminal device to connect to the registered printer via Wi-Fi Direct. As a specific example, the MAC address of the printer is acquired. If multiple printers are selected as registered printers, the above process is repeated a number of times equal to the number of registered printers. Information associating together the network connection method and the network connection information acquired in steps S701 and S702 is saved as a network connection candidate in the non-volatile memory 229, similarly to the specifying information and the printing device information of the registered printer. Note that if the MAC address is saved as the specifying information of the printer, the network connection information may also be in a form that references the specifying information of the printer.

Figure 8:
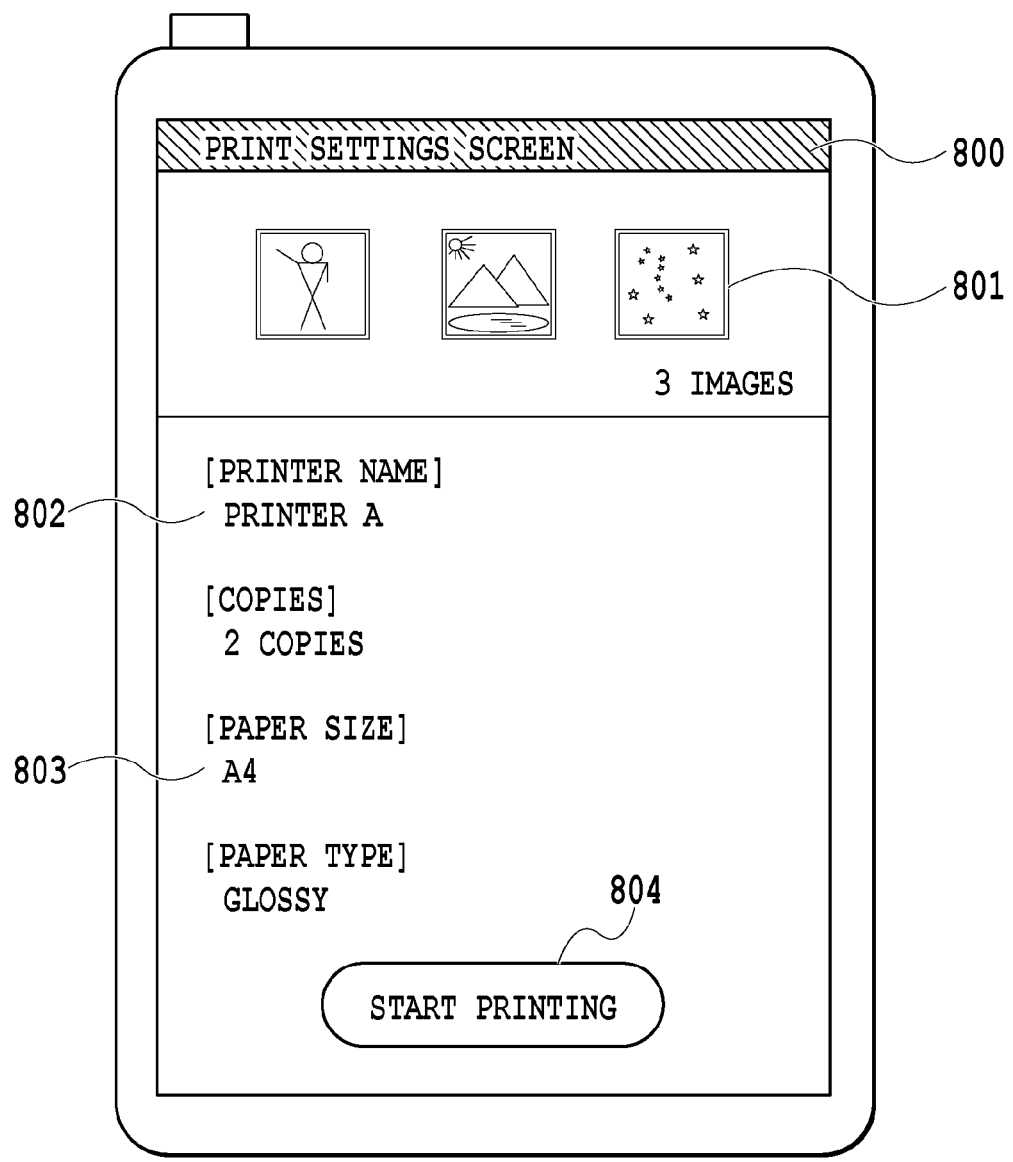
FIG. 8 is a UI diagram illustrating a print settings screen of a printing application in a terminal device according to a first embodiment.

FIG. 8 is a print settings screen 800 that configures print settings from among the screens of the printing application. In the printer name display area 802, a printer name of the current printer on which to execute various functions of the printing application from among the registered printers is displayed. The displayed printer name is a name included in the printing device information saved in association with the current printer. Note that if there are multiple registered printers, the name of a registered printer selected by the user through a selection screen (not illustrated) or the like is displayed as the current printer. In the printing parameter display area 803, printing parameters when executing printing are displayed. The user is able to change the printing parameters as appropriate. In the thumbnail display area 801, thumbnails of images to be printed are displayed. The images to be printed are decided by displaying a list of thumbnails acquired from image data in the non-volatile memory 229, and causing the user to make a selection.

The user, when instructing the printing application to start printing, selects the Start Printing button 804 via the panel unit 204. When the selection of the Start Printing button 804 is received, the printing application transmits, to the current printer (in the present embodiment, Printer A), an instruction to perform a process of printing the images corresponding to the thumbnails selected by the user, according to the printing parameters displayed in the printing parameter display area 803. When the instruction to perform the printing process is transmitted, in the present embodiment, the printing application determines whether or not a network connection with the current printer is established, and if necessary, conducts a process of automatically switching the network connection.

Figure 9:
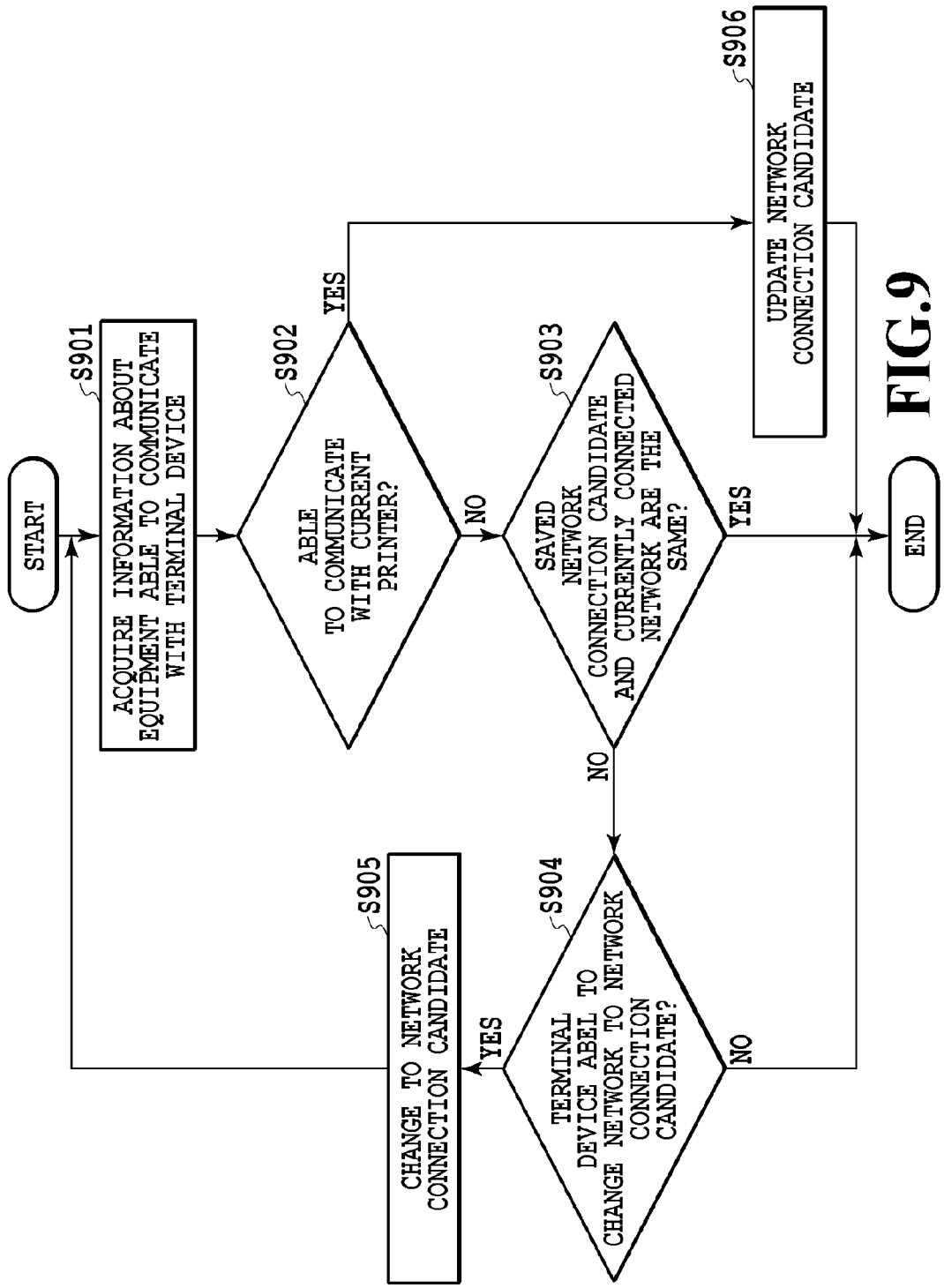
FIG. 9 is a flowchart of a process of establishing a network connection with a printer in a terminal device according to a first embodiment.

FIG. 9 is a connection process flow for establishing a network connection between the terminal device and the printing device when the printing application of the terminal device transmits an instruction to execute a printing process to the current printer. This process is conducted in response to the Start Printing button 804 in FIG. 8 being selected. Similarly to the process in FIG. 7, the process in FIG. 9 is a process executed by the printing application.

First, in step S901, the printing application acquires information about a group of equipment able to communicate with the terminal device. For example, the printing application causes the terminal device via an OS or the like to broadcast on the network to which the terminal device currently is connected, and acquires a list of the MAC addresses of connected equipment obtained as a result. After information about the group of equipment able to communicate with the terminal device is acquired, the process proceeds to step S902. Note that although broadcasting is described herein by taking the case of the terminal device operating in infrastructure mode as an example, a query may be performed appropriately according to the connection mode.

In step S902, the printing application determines whether or not information about the current printer is included among the able-to-communicate equipment group information acquired in step S901. Specifically, the printing application checks whether or not the MAC address saved as printer connection information during the printer registration process for the current printer is included in the MAC address list acquired in step S901. If not included, the process proceeds to step S903. If included, the process proceeds to step S906.

If information about the current printer is included among the able-to-communicate equipment group information on the currently connected network, the printing application determines that the terminal device is able to communicate with the current printer. As an example, suppose that the current printer is Printer A illustrated in FIG. 6. Suppose that Printer A was registered in a state of making a network connection in infrastructure mode via Access Point A. Herein, suppose that at the time of step S902, the current network connection method of the terminal device is infrastructure mode, and the connection is made via Access Point A, for example. In this case, in the process of step S901, the terminal device connected by the same access point (Access Point A) is able to acquire the MAC address of Printer A as a result of a broadcast. Consequently, in step S902, the printing application determines that the terminal device is able to communicate with the current printer, and the process proceeds to step S906. In step S906, the printing application updates the information about the network connection candidate of Printer A saved in the non-volatile memory 229. Note that in the specific example above, there is no change in the information before and after the update. A case in which there is a change in the information will be discussed later.

On the other hand, in step S902, if the printing application determines that the terminal device is not able to communicate with the current printer, the process proceeds to step S903. In step S903, the printing application determines whether or not the network connection candidate of the current printer saved in the non-volatile memory 229 and the network to which the terminal device currently is connected are the same. If the same, since it has already been determined in step S902 that communication with the current printer is unavailable on the current network connection, the process ends on a communication error. If the networks are different, the process proceeds to step S904.

The process in step S903 will be described in terms of a specific example. In the example described previously, suppose that the terminal device had switched the network connection method to Wi-Fi Direct mode rather than the infrastructure mode that was being used during the registration of Printer A. In other words, consider an example in which the terminal device connects to other communication equipment in Wi-Fi Direct mode, and the current printer is connected in infrastructure mode using Access Point A. In this case, the network connection method of the terminal device is Wi-Fi Direct mode, and since this differs from the network connection candidate saved for the current Printer A, the process proceeds to step S904. In addition, suppose that even though the network connection method of the terminal device is the same infrastructure mode as Printer A, the network connection information (SSID) is different from that of Printer A. In other words, suppose that the terminal device is connected to the network of a different access point (for example, Access Point X). Likewise in this case, the network connection candidate of the current printer and the network to which the terminal device currently is connected are different, and thus the process proceeds to step S904.

In step S904, the printing application determines whether or not the terminal device is able to change the network to the network connection candidate of the current printer. Using the example discussed above, since the network connection method saved in association with Printer A is infrastructure mode, the printing application acquires, via the OS of the terminal device, a list of access points that the terminal device is able to connect to. Among these, if the network connection information, namely the SSID, saved in association with Printer a (Access Point A) is included, the printing application determines that a network connection change is possible, and proceeds to step S905. If not included, the printing application ends the process on a communication error. Meanwhile, suppose hypothetically that the current printer is not Printer A, but instead Printer B, whose network connection method is Wi-Fi Direct. At this point, if the terminal device currently is making a network connection in infrastructure mode, the printing application performs service discovery to determine whether or not a connection via Wi-Fi Direct is available. In other words, the printing application instructs the OS of the terminal device to execute Wi-Fi Direct service discovery, and acquires a list of connectable equipment (peers). Subsequently, it is sufficient to determine whether or not the network connection information, namely the MAC address, is included on the acquired list of peers.

In step S905, the printing application uses the network connection candidate saved in association with the current printer to change the network connection of the terminal device. Described in terms of the specific example above, the terminal device changes the network connection to Access Point A in infrastructure mode. Note that at this point, if the terminal device is connected by an LTE link before executing the printing process, for example, the terminal device breaks the LTE link as necessary, and changes the network connection to Access Point A in infrastructure mode. After the network connection is changed, the process returns to step S901.

In step S902, if the printing application determines that the terminal device is able to communicate with the current printer, the process proceeds to step S906. In step S906, the printing application updates the network connection candidate of the current printer saved in the non-volatile memory 229 with the network connection method and the network connection information by which the terminal device currently is connected.

A specific example in which the update in step S906 occurs will be described. As discussed earlier, the process in step S901 is a process of acquiring information about connected equipment on the network to which the terminal device currently is connected. For example, the terminal device broadcasts to a group of equipment in the coverage of the access point, and the printing application determines whether or not the obtained MAC addresses are already registered.

At this point, it should be noted that in the case of communication in infrastructure mode, the MAC address of the current printer does not change, even across different access points. This is because a MAC address is an identification number assigned to a physical radio module, and if communication is conducted using the same radio module, the MAC address will be the same.

One case in which the update in step S906 may occur is when the terminal device and Printer A is registered in infrastructure mode using Access Point A, but the user is intentionally attempting to use Access Point X. In this case, the user changes the network connection of Printer A from Access Point A to X, and also changes the network connection of the terminal device to Access Point X. In such a situation, if the process illustrated in FIG. 9 is started, in step S901 the MAC address of Printer A will be included in the information about the group of equipment that can be communicated with in infrastructure mode using the currently connected Access Point X. In other words, even in the case of using an access point that is not the access point from the time of registration, the terminal device is still able to communicate with the current printer. In such a case, the process proceeds from step S902 to step S906, and the SSID of the information (network connection information) saved in association with Printer A is updated from Access Point A to Access Point X.

Note that in the flowchart illustrated in FIG. 9, after determining that communication is possible with the current printer over the currently connected network in step S902, it is determined whether or not the network is changeable to the network connection candidate in step S904. However, the process is not limited thereto, and the determination in step S902 may be conducted after the determination in step S904, for example, or the above two determinations may be conducted in parallel. In other words, the determination in step S904 may be conducted irrespectively of whether or not communication is possible with the current printer over the network to which the terminal device currently is connected.

However, in the flowchart illustrated in FIG. 9, if it is determined that communication is possible with the current printer over the currently connected network in step S902, the determination in step S904 is not conducted. For this reason, by conducting the determinations in the order of the flowchart illustrated in FIG. 9, unnecessary execution of the determination in step S904 may be prevented.

In this way, in the present embodiment, if the terminal device is able to communicate with the current printer via the current connection mode, the use of that connection is prioritized. Consequently, unnecessary network switching may be prevented. Additionally, if communication is possible between the terminal device and the current printer, the information at that time is used to update the previously registered information. Also, if communication with the current printer is not possible via the current connection mode, the previously registered information is referenced to switch the network connection automatically.

In this way, in the present embodiment, if a network connection is not established with the current printer, a network connection by which communication was possible is used to connect to a network automatically, thereby enabling communication with the printer to be established. On the other hand, changing the network connection increases the processing load and processing time on the terminal device, and is disadvantageous to the user. Before changing the network connection, a broadcast is used to check the communication availability and whether or not changing the network connection is possible, thereby preventing unnecessary changes to the network connection method.

Note that in this working example, the currently connected network connection method is taken to be Wi-Fi infrastructure mode while the different network connection method is taken to be Wi-Fi Direct, but the configuration is not limited thereto. For example, Bluetooth (registered trademark) is also acceptable.

<Embodiment 2>

In the first embodiment, when registering the current printer, the terminal device is taken to perform registration by connecting to the current printer in infrastructure mode using Access Point A. After that, when executing a printing process, there is a possibility that only the current printer has changed its network connection, and is connected via an access point or a network connection method different from Access Point A. In this case, the terminal device is unable to find the current printer with the current network connection (Access Point A), and is also unable to communicate using the network information from the time of registration (in other words, Access Point A). As a result, a communication error may occur, and communication between the terminal device and the current printer may be unavailable in some cases. In the present embodiment, a technique of establishing communication between the terminal device and the printer even in the state discussed above will be described.

In the present embodiment, not only are the network connection candidates of the current printer saved when registering the current printer (or when updating the information), but also network connection candidates usable by the current printer are saved as a list. In addition, an example will be described in which the list is given a priority ranking, and network connections are tested by following the priority ranking. According to such a process, priority may be given to switching the process to network connection candidates with a low likelihood of disconnection and few communication restrictions, thereby reducing factors such as load.

In addition, in the example of step S906 in the first embodiment, an example is described in which, if the connection mode is the same connection method (for example, infrastructure mode) and a connection is successful over a network with different network connection information (SSID), the previously registered information is updated with the relevant network connection information.

However, in some cases, the user changes the networks of both the terminal device and the current printer to network connection methods that are different from the network connection method from the time of registration. In such cases, even though the terminal device may be in an environment enabling communication with the current printer, the terminal device is unable to recognize the current printer, and as a result, may determine in some cases that connection is not possible. This is because with different connection methods, the MAC address used to specify a device is sometimes different depending on the connection method.

In the present embodiment, a configuration that additionally modifies the process in step S902 described in the first embodiment will be described. Consequently, for example, even if the user switches both devices to a different network connection method (for example, access point mode) from the network connection method at the time of registration (for example, infrastructure mode), communication between the terminal device and the communication device becomes possible without problems. Hereinafter, the process of the second embodiment will be described specifically.

Figure 10:
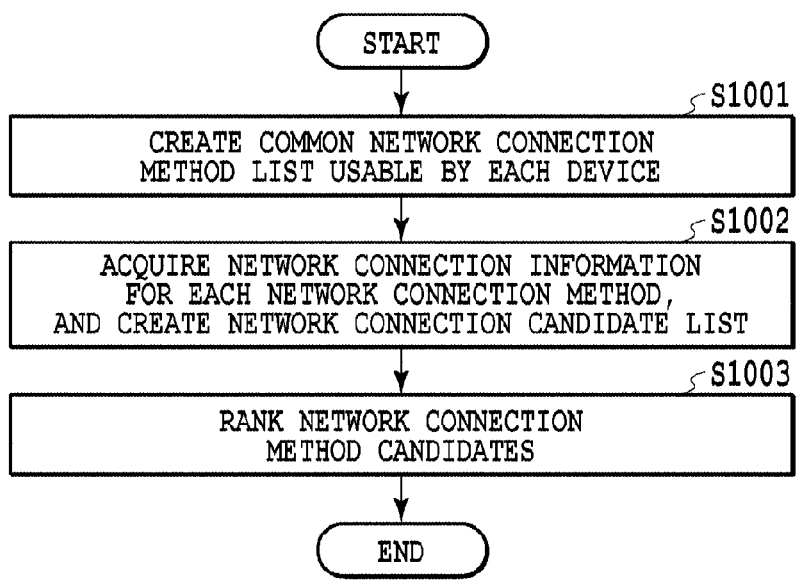
FIG. 10 is a flowchart of saving a network connection candidate list, executed in a terminal device according to a second embodiment.

FIG. 10 is a flowchart of a process of generating and saving a network connection candidate list for a registered printer according to the present embodiment. A network connection candidate list is a list of network connection candidates usable between the terminal device and a registered printer, and is information that ranks network connection candidates. In the printer registration process executed by the printer registration screen 600 of the first embodiment, the network connection method and the network connection information by which the printing device currently is connected are saved as a network connection candidate. In contrast, in the present embodiment, not only the network connection candidate by which the printing device currently is connected, but also network connection methods and network connection information included as functions in the printing device are additionally saved. The process illustrated in FIG. 10 is a process executed by the printing application when the user selects a registered printer on the printer registration screen 600.

In step S1001, the printing application creates a network connection method list for each of the registered printer and the terminal device.

FIG. 11A is a list 1100, created by the printing application, of network connection methods included as functions in the terminal device. In the example illustrated in FIG. 11A, the printing application acquires, via the OS of the terminal device, information indicating infrastructure mode, infrared communication, Bluetooth, and Wi-Fi Direct as information about the network connection methods included as functions in the terminal device. Additionally, the printing application acquires, from the printer to be registered, the network connection methods included as functions in that printer at the time of printer registration. For example, the printing application transmits, to the printer to be registered, a transmission request for the printer to transmit the network connection methods included as functions in the printer, and acquires network connection methods received from the printer in response to the transmission request.

FIG. 11B is a list 1101, created by the printing application, of network connection methods of the printer. In the example illustrated in FIG. 11B, the printing application acquires, from the printer to be registered, information about the network connection methods included as functions in that printer. Specifically, the printing application acquires information indicating that the network connection methods of infrastructure mode, Wi-Fi Direct, and an access point mode utilizing the access point unit 308 of the printing device 300 are usable. Note that access point mode is identified as infrastructure mode from the perspective of the terminal device to connect with. This is because the access point unit 308 built into the printing device 300 includes functions similar to an access point.

The printing application, after creating a network connection method list for each of the terminal device and the printer, uses these lists to create a list of the network connection methods usable by both devices. Since the terminal device includes an infrastructure mode function, the infrastructure mode and the access point mode (which is treated as infrastructure mode from the perspective of the terminal device) of the printer are extracted as candidates to be included on the list. Additionally, Wi-Fi Direct mode is also extracted as a candidate to be included on the list. On the other hand, the infrared communication and Bluetooth (registered trademark) of the terminal device are not usable by the printer, and thus are excluded from the list. FIG. 11C is a list 1102 of network connection methods usable by both devices created in this way. Note that although FIG. 11C illustrates access point mode as an independent connection method for the sake of convenience, it should be appreciated that access point mode is recognized as infrastructure mode from the perspective of the printing application (terminal device). After that network connection method list is created, the process proceeds to step S1002.

In step S1002, the printing application acquires network connection information required to establish a connection via each network connection method included on the network connection method list. Subsequently, the printing application creates a network connection candidate list by associating the acquired information with each network connection method. FIG. 11D is a list 1103 of network connection candidates in which network connection information is associated with the list of network connection methods in FIG. 11C. To connect in infrastructure mode, an SSID is required. If the terminal device currently is connected in infrastructure mode, the SSID of the access point to which the terminal device is connected during registration (in the illustrated example, the SSID ACCESS_POINT_A of Access Point A) is acquired. Additionally, the MAC address obtained when performing the communication availability check by broadcasting (in the illustrated example, GG:HH:II:JJ:KK:LL) is also acquired. Meanwhile, for the network connection information of the network connection methods by which the terminal device currently is not connected, an acquisition request to acquire network connection information is transmitted to the printing device, and the network connection information obtained in response to the acquisition request is used. For example, information about Wi-Fi Direct and access point mode is obtained when acquiring a function list from the printing device by communication with the printing device. As the information about Wi-Fi Direct, the MAC address of the printing device (in the illustrated example, AA:BB:CC:DD:EE:FF) is acquired. As the information about access point mode, the SSID of the access point unit 308 (in the illustrated example, PRINTER_ACCESS_POINT) and the MAC address of the printing device (in the illustrated example, MM:NN:OO:PP:QQ:RR) are acquired. Note that the printing device may also transmit the network connection information together with the usable network connection methods transmitted to the terminal device, and in step S1002, the printing application may use this transmitted information, including the current network connection method and network connection information. Additionally, the password of the access point may also be included among the network connection information acquired from the printing device. By including the password, it becomes possible to connect to a password-protected access point, even if a connection has never been made before.

In the above description, in the printing device, Wi-Fi Direct and access point mode both are conducted using the built-in access point unit 308. In such a case, the MAC address of the printing device becomes the same, irrespectively of which connection method is used. If a separate radio module is used, the MAC address becomes different, as illustrated in FIG. 11D.

In the example illustrated in FIG. 11D, it should be appreciated that the MAC address specifying the printing device in infrastructure mode and the MAC address specifying the printing device in access point mode are different. This is because the wireless LAN unit 307 is used in the case of infrastructure mode, while the access point unit 308 is used in the case of access point mode. After the network connection candidate list is created, the process proceeds to step S1003.

In step S1003, the printing application decides the order in which to prioritize connecting to the network connection candidates on the network connection candidate list created in step S1002. FIG. 11E is a list 1104 of network connection candidates given a priority ranking. In the present embodiment, a higher priority ranking is set for network connection methods having a high likelihood of connection and few communication restrictions. Specifically, assume that the terminal device is capable of connecting simultaneously via Wi-Fi Direct and a mobile phone network via the network connection unit 203, whereas in infrastructure mode, the terminal device is unable to use the network connection unit 203. In this case, since Wi-Fi Direct has fewer functional restrictions than access point mode and infrastructure mode, the priority ranking of Wi-Fi Direct becomes higher. Additionally, if the access point mode of the printer is used, the connection does not go through an external access point and thus another terminal device does not enter the network environment, resulting in a network configuration that effectively operates like direct communication with the printer. For this reason, there are few restrictions on the communication environment. Consequently, the priority ranking of access point mode is set higher than infrastructure mode. For this priority ranking setting method, preset priority ranking rules may be decided according to factors such as combinations of network connection methods that may be taken as above, and the printing application may follow these rules to set the priority ranking. Alternatively, the printing application may also display a priority ranking setting screen (not illustrated), and set the priority ranking in accordance with content indicated by the user. The printing application saves the ranked network connection candidate list in the non-volatile memory 229, and ends the process.

Figure 12:
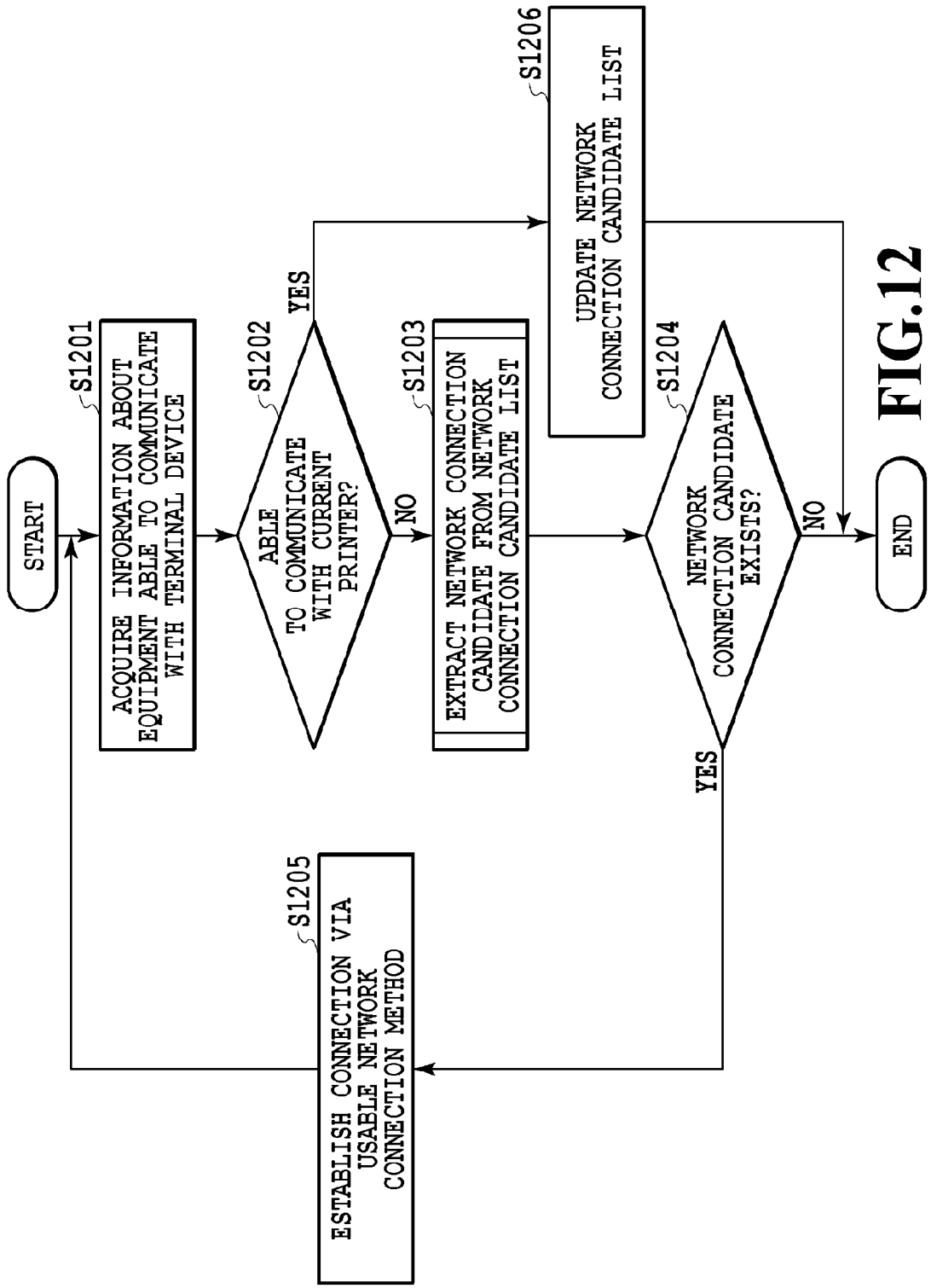
FIG. 12 is a flowchart of a process of establishing a network connection with a printer, executed in a terminal device according to a second embodiment.

FIG. 12 is a connection process flow for establishing a network connection between the terminal device and the current printer in the printing process. Similarly to the process illustrated in FIG. 9, the process illustrated in FIG. 12 is a process that is started by the printing application when the Start Printing button 804 illustrated in FIG. 8 is selected.

First, in step S1201, the printing application acquires information about a group of equipment able to communicate with the terminal device. Specifically, the printing application broadcasts on the network to which the terminal device currently is connected, and acquires a list of the MAC addresses of connected equipment obtained as a result. Step S1201 is a process similar to step S901. After information about the group of equipment able to communicate with the terminal device is acquired, the process proceeds to step S1202.

In step S1202, the printing application checks whether or not information about the current printer is included among the able-to-communicate equipment group information acquired in step S1201. The process in step S1202 is different from step S902. Specifically, in step S1202, the printing application checks whether or not any of the MAC addresses on the network connection candidate list 1104 are included among the MAC addresses acquired in step S1201. The reason for processing in this way will be explained.

First, as a basic approach similar to the first embodiment, if communication with the current printer is possible on the network to which the terminal device currently is connected, communicating with the current printer using the currently connected network is prioritized. This is because if communication with the current printer is possible on the already connected network, even if hypothetically there is another network connection candidate with a higher priority ranking, prioritizing the use of the current network connection does not produce a load, such as the process of switching the network.

In the present embodiment, the determination of whether or not a MAC address acquired in step S1201 corresponds to one on the network connection candidate list 1104 becomes a process that is decisively different from the process of the first embodiment.

A description citing a specific example will now be given. First, assume that both the terminal device and the current printer were connected through Access Point A in infrastructure mode during registration. At this point, suppose that for some reason, the user has changed the network connection to Access Point C for both the terminal device and the current printer. Suppose that Access Point C is used in access point mode using the access point unit built into the current printer.

In the above case, with the process of the first embodiment, communication between the terminal device and the current printer cannot be established. The reason for this is because, since different radio modules are used in access point mode and infrastructure mode, the respective MAC addresses are different from each other. In the process of the first embodiment, in cases in which the MAC address is not changed, or in other words, when the access point is switched for both devices in infrastructure mode, there is no change in the MAC address itself. Consequently, in the process of the first embodiment, communication is possible because the terminal device is able to find the current printer on the current network. On the other hand, if infrastructure mode is switched to access point mode, since the terminal device recognizes access point mode as being infrastructure mode, the terminal device is unable to find the current printer on the currently connected network (Access Point C). Subsequently, by NO in step S903, step S904, and step S905 of the first embodiment, the network connection is switched to Access Point A from the time of registration. However, since the current printer is connected to the network via Access Point C in access point mode as discussed above, the process proceeds through NO in the determination of step S902 again, YES in the determination of step S903, an error occurs, and communication cannot be established.

In contrast, with the process of the present embodiment, in the process of step S1202, it is determined whether or not a MAC address acquired in step S1201 corresponds to one on the network connection candidate list 1104. In the case of the specific example above, the terminal device is able to acquire the MAC address of the current printer on the same network as Access Point C on the current network connection (access point mode). Consequently, since communication is possible, the process proceeds to step S1206, and the network connection candidate list is updated. In other words, the terminal device communicates with the current printer via a connection going through the currently connected Access Point C (access point mode).

In addition, another specific example will be described. Suppose that in a case in which the terminal device registered the current printer in the state of Access Point A, only the current printer switches its network to access point mode. In this case, NO is determined in step S1202, but by a subsequent process discussed later, a switch to a usable network connection candidate is performed, and thus the terminal device becomes able to communicate with the current printer.

In this way, according to the present embodiment, even if a connection is made in infrastructure mode during printer registration and later the printer is reconnected in access point mode, the communication availability may be checked, thereby avoiding an unnecessary connection change and preventing a situation in which communication becomes unavailable.

In step S1203, the printing application reads out the network connection candidate list 1104 saved in the non-volatile memory 229, and in order from the network connection candidate with the highest priority ranking, extracts a network connection candidate which currently is not connected, but to which the connection may be changed.

The printing application uses the Wi-Fi Direct function, which is ranked first on the network connection candidate list 1104, to check whether or not it is necessary to connect the terminal device and the printer. Specifically, the printing application instructs the OS of the terminal device to execute Wi-Fi Direct service discovery, and acquires a list of connectable equipment (peers). The printing application checks whether or not the connection information on the network connection candidate list 1104, namely the MAC address (in the illustrated example, AA:BB:CC:DD:EE:FF) is included among the acquired list of peers. If not included, the printing application checks whether or not a connection is possible via the network connection candidate with the next highest priority ranking. Even if included, if the terminal device and the printer currently are connected via Wi-Fi Direct, the printing application determines that communication is not possible with this network connection candidate in step S1202, and checks the network connection with the next highest priority ranking. If the connection candidate is infrastructure mode or access point mode, the printing application acquires, via the OS of the terminal device, a list of access points that the terminal device is able to connect to. Among these, if connection information corresponding to the network connection candidate list 1104 (in the illustrated example, the SSID) is included, the process proceeds to step S1204. If a connectable network connection candidate is not found in step S1204, the printing application ends the process on a communication unavailable error. If found, the process proceeds to step S1205.

Figure 13:
FIG. 13 is a diagram of a network connection method candidate list according to a third embodiment.

In step S1205, the printing application establishes a connection between the terminal device and the printer via the network connection candidate determined to be connectable in step S1203. After the network connection is established, the process proceeds to step S1201. In step S1202, if communication with the current printer is determined to be possible, the process proceeds to step S1206. In step S1206, the printing application updates the network connection candidate list 1104 saved in the non-volatile memory 229 with the network connection information by which the terminal device currently is connected. Specifically, if the terminal device changes the network environment to communicate with the printer via Access Point B in infrastructure mode according to a user operation, the printing application creates a network connection method candidate list 1300 as illustrated in FIG. 13. Subsequently, the printing application overwrites and saves the network connection method candidate list 1300 in the non-volatile memory 229. As illustrated in the drawing, even if the printer and the terminal device were connected via Access Point A in infrastructure mode during registration, when executing printing, the latest Access Point B allowing communication is set with a higher priority ranking than Access Point A and registered.

Thus, according to the present embodiment, if the terminal device is unable to communicate with the current printer via the current network connection, a connection is made by prioritizing the latest network connection allowing communication or a network connection candidate with a high likelihood of connection. Consequently, the terminal device is able to establish communication with the printer. On the other hand, changing the network connection increases the processing load and processing time on the terminal device, and is disadvantageous to the user. Before changing the network connection, a broadcast is used to check in advance the communication availability and whether or not changing to a network connection candidate is possible, and thus unwanted changes to the network connection method may be made unnecessary.

Note that in the present embodiment, when creating the network connection candidate list, information about both the terminal device and the printer is used, but information about either one is also acceptable.

<Embodiment 3>

In the embodiments discussed above, the processes illustrated in FIGS. 9 and 12 are described as being started when triggered by the selection of the Start Printing button 804 illustrated in FIG. 8, but the configuration is not limited thereto. For example, the above processes may also be executed during a screen transition, or when the printing application launches. Additionally, the processes illustrated in FIGS. 9 and 12 may also be started every time the current printer is changed.

Figure 14:
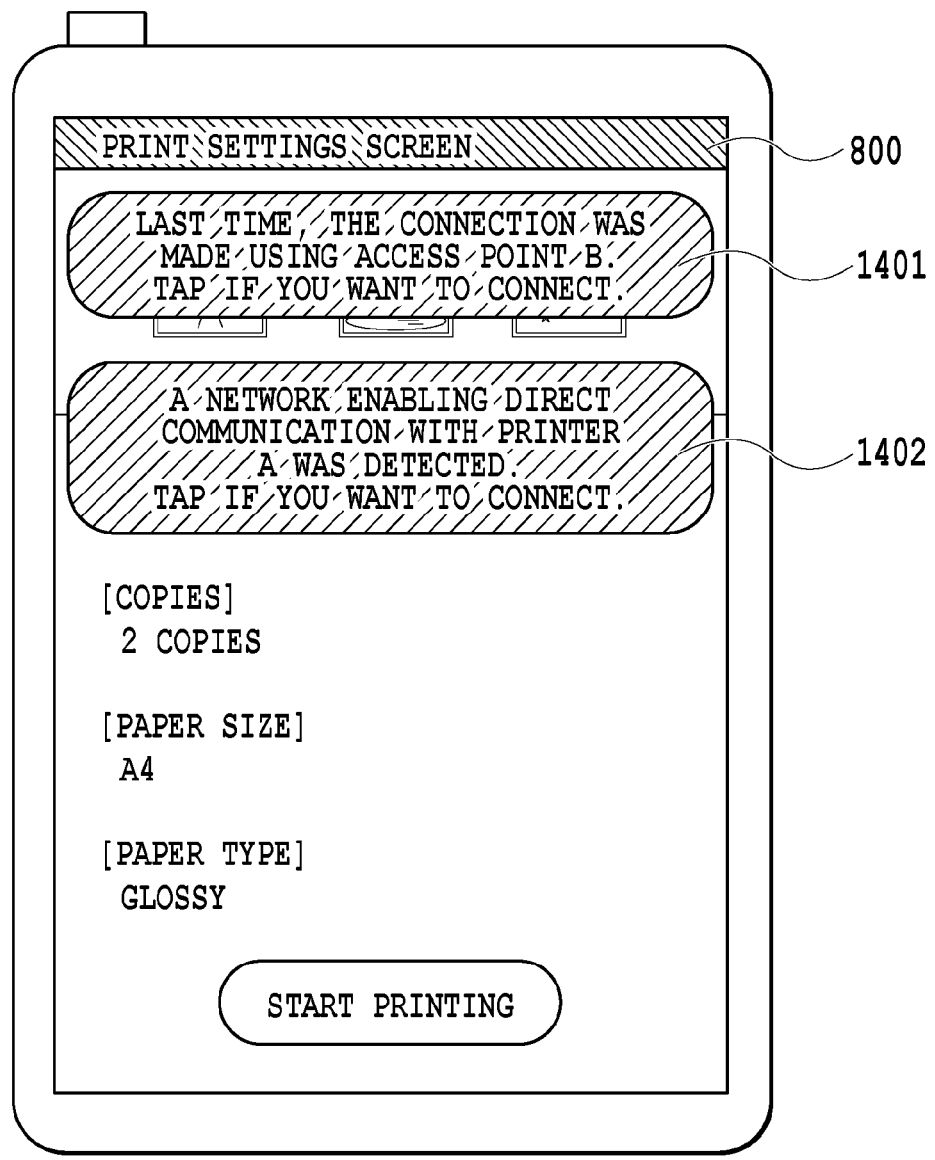
FIG. 14 is a UI diagram illustrating a network connection change notification according to a fourth embodiment.

In addition, in the embodiments discussed previously, a process of switching the network connection automatically is discussed, but the configuration is not limited thereto. For example, in some cases an application may be forbidden from performing network configuration by the OS of the terminal device. In such cases, the user may be notified of the need to change the network connection with a display like the dialogs 1401 and 1402 as illustrated in FIG. 14, for example.

<Embodiment 4>

In the embodiments discussed above, the network connection process is conducted before executing printing, but a configuration in which the network state before the network connection is saved, and after printing finishes, the network state is reverted back to the saved network connection state is also acceptable. For example, if the terminal device is connected via LTE before the network connection process, even if the terminal device is connected to Access Point A in infrastructure mode by the network connection process, the terminal device may be reconnected to LTE after printing finishes.

<Embodiment 5>

The embodiments discussed above are described by taking an example for the case of using a printing device as the communication device, but the configuration is not limited thereto. For example, a device including communication functions, such as headphones, a digital camera, or a hard disk drive is also acceptable.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even if the communication environment, such as the connection method and the network, being used by the terminal device is different from the communication environment of the communication device, the terminal device is able to connect to the communication device according to the communication environment of the communication device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-213770 filed Oct. 30, 2015, which is hereby incorporated by reference wherein in its entirety.

What is claimed is:

1. A method of controlling a terminal device having at least one memory storing a program and a processor to execute the program, the control method comprising the steps of:
   searching for a communication device;
   registering, if the communication device is detected in the searching step, communication information used for a first network connection by which the detection of the communication device is performed;
   determining in a first determining step whether or not communication with the communication device is available by a second network connection to which the terminal device is currently connected;
   determining in a second determining step whether or not communication with the communication device is available by the first network connection, based on the registered communication information; and
   communicating with the communication device using the first network connection, if the first network connection is different from the second network connection and communication with the communication device is determined to be unavailable in the first determining step, and also if communication with the communication device is determined to be available in the second determining step.

2. The method of controlling a terminal device according to claim 1, wherein
   if communication with the communication device is determined to be unavailable in the first determining step, the determination in the second determining step is conducted.

3. The method of controlling a terminal device according to claim 1, wherein
   the communication information indicates a network connection method of the first network connection, and in the second determining step, it is determined whether or not communication with the communication device using the indicated network connection method is available.

4. The method of controlling a terminal device according to claim 1,
   wherein
   in the registering step, network connection information used in the first network connection, is registered as the communication information.

5. The method of controlling a terminal device according to claim 4, further comprising the steps of:
   acquiring network connection methods usable by the communication device,
   wherein in the registering step, the network connection information and the acquired network connection methods are registered,
   wherein in the second determining step, it is determined whether or not communication with the communication device is available by the network connection information and a network connection method included in the network connection methods.

6. The method of controlling a terminal device according to claim 5, wherein
   in the acquiring step, the network connection methods are acquired from the communication device.

7. The method of controlling a terminal device according to claim 5, wherein in the registering step, a list which includes network connection methods usable by the communication device and indicates a priority order of the network connection methods, is registered, and
   wherein in the second determining step, it is determined whether or not communication with the communication device is available sequentially for a network connection method included in the list in accordance with the priority order indicated by the list.

8. The method of controlling a terminal device according to claim 4, wherein
   the network connection information
   includes an SSID of an access point used in the first network connection, and
   in the second determining step, one or more access points to which the terminal device is capable to connect are specified, and it is determined whether or not the access point used in the first network connection is included in the one or more access points, based on the SSID included in the network connection information, and it is determined whether or not communication with the communication device is available by the first network connection in a case where the access point used in the first network connection is included in the one or more access points.

9. The method of controlling a terminal device according to claim 8, wherein the network connection information includes the SSID or a MAC address if the first network connection is connected by an infrastructure mode or an access point mode.

10. The method of controlling a terminal device according to claim 8, wherein the network connection information includes a MAC address if the first network connection is connected by Wi-Fi Direct.

11. The method of controlling a terminal device according to claim 1, wherein
    in the registering step, identification information identifying the communication device is further registered, and
    in the first determining step and the second determining step, whether or not communication with the communication device is available is determined based on the identification information.

12. The method of controlling a terminal device according to claim 11, wherein
    the identification information includes a MAC address.

13. The method of controlling a terminal device according to claim 1, further comprising the step of:
    updating registered communication information with communication information used for the second network connection, if communication with the communication device is determined to be available in the first determining step.

14. A terminal device that communicates over a predetermined wireless network with a communication device registered as a communication peer on the wireless network, the terminal device comprising:
    at least one memory storing a program;
    a processor which executes the program and causes the terminal device to function as:
    a search unit that searches for a communication device;
    a registration unit that registers, if the communication device is detected by the search unit, communication information used for a first network connection by which the detection of the communication device is performed;
    a first determination unit that determines whether or not communication with the communication device is available by a second network connection to which the terminal device is currently connected;

a second determination unit that determines whether or not communication with the communication device is available by the first network connection, based on the communication information registered by the registration unit; and a communication unit that communicates with the communication device using the first network connection, if the first network connection is different from the second network connection and the first determination unit determines that communication with the communication device is unavailable, and also if the second determination unit determines that communication with the communication device is available.

15. The terminal device according to claim 14, wherein the communication device comprises a printing mechanism which prints an image on a printing medium.

16. The terminal device according to claim 14, wherein the communication device comprises a reading mechanism which reads an original.

17. A non-transitory computer readable storage medium storing a program for causing a computer to perform a method of controlling a terminal device that communicates over a predetermined wireless network with a communication device registered as a communication peer on the wireless network, the method comprising the steps of:

searching for a communication device;

registering, if the communication device is detected in the searching step, communication information used for a first network connection by which the detection of the communication device is performed;

determining in a first determining step whether or not communication with the communication device is available by a second network connection to which the terminal device is currently connected;

determining in a second determining step whether or not communication with the communication device is available by the first network connection, based on the registered communication information; and communicating with the communication device using the first network connection, if the first network connection is different from the second network connection and communication with the communication device is determined to be unavailable in the first determining step, and also if communication with the communication device is determined to be available in the second determining step.

18. The storage medium according to claim 17, wherein the communication information indicates a network connection method of the first network connection, and in the second determining step, it is determined whether or not communication with the communication device using the network connection method indicated by the communication information is available.

19. The storage medium according to claim 17, wherein in the registering step, network connection information used in the first network connection is registered, as the communication information.

20. The storage medium according to claim 19, wherein the network connection information includes an S SID of an access point used in the first network connection, and in the second determining step, one or more access points to which the terminal device is capable to connect are specified, and it is determined whether or not the access point used in the first network connection is included in the one or more access points, based on the SSID included in the network connection information, and it is determined whether or not communication with the communication device is available by the first network connection in a case where the access point used in the first network connection is included in the one or more access points.

* * * * *